Patented Sept. 12, 1939

2,172,747

UNITED STATES PATENT OFFICE 2,172,747

METHOD OF CONDENSING ORGANIC OXIDES AND AMINO TYPE MATERIAL, AND PRODUCTS THEREFROM

Albert Frank Bowles, Jersey City, and Saul Kaplan, Teaneck, N. J., assignors to The Richards Chemical Works, Incorporated, Jersey City, N. J., a corporation of New Jersey No Drawing. Application June 12, 1936, Serial No. 84,895

14 Claims. (Cl. 260—457)

Our invention relates to a process of, and the products resulting from, condensing an organic oxide with amino-type material in the presence of certain types of aldehydes or alcohols or acids, usually, but not necessarily, with the aid of a catalyst. The invention also includes sulfating and/or sulfonating such condensates and the products resulting therefrom.

The object of the invention is to produce products for use in the textile, leather and related industries, such compounds having highly satisfactory wetting out, penetrating, lime resistance, lime dispersing, foaming, dye leveling, sizing, finishing, detergent and emulsifying properties.

Any of the low and medium high carbon members of the alkylene oxide series may be used, such as ethylene, propylene, butylene, amylene, hexylene or heptylene oxide.

By the term "amino-type material" we intend to include such substances as:

(1) Urea, thiourea, homologues thereof and their isomers.

(2) Aromatic amino compounds, such as aniline, 1,4=diamino, 2,6=dihydroxy naphthalene and p—toluidin—meta=amino phenol.

(3) Protein type bodies, such as gelatin and glue.

(4) Amino acids, such as the peptides and polypeptides.

(5) Amino compounds such as ketines.

The above are given merely as examples of the general class of amino-type material suitable for the purposes of the present invention.

The aldehydes may be of the aliphatic series, provided they contain not less than three or more than twenty carbon atoms, except that the lower members of the series, formaldehyde and acetaldehyde may be used in conjunction with the alcohols and/or acids falling within the groups named below. Suitable aliphatic aldehydes are lauryl and myristyl aldehydes (the chief constituents of aldehydes derived from the fatty acids of cocoanut oil.

Aryl aldehydes, such as benzaldehyde, may also be used.

Aliphatic alcohols containing from eight to twenty carbon atoms may be used. These include lauryl, cetyl, stearyl and oleyl alcohols.

Aromatic alcohols, such as phenol or cresol, may be used.

In place of either the alcohol or aldehyde, an aliphatic acid containing from eight to twenty carbon atoms may be used. As examples of such acids may be mentioned oleic, palmitic, lauric, myristic, sorbic, ricinoleic acids.

Aromatic acids, such as benzoic acid, may also be utilized.

The aliphatic compounds may be straight or branched chain, saturated or unsaturated, and may contain aryl or other groups or elements like the halogens. Similarly, the aromatic compounds may contain alkyl, alkoxy or other groups or elements substituted for one or more hydrogens.

The products obtained by condensing the oxides, amino-type compounds and aldehydes, alcohols or acids, as defined above, have very marked lipophyllic and hydrophyllic properties. Further, even without treatment with sulfuric acid or the like, they are more or less soluble in alkalies, mineral acids, water and in most of the common organic solvents.

When such products are sulfated or sulfonated, the resulting sulfate or sulfonic acid, or the alkali salts thereof, have their solubility in water greatly increased, and at the same time their effectiveness in the treatment and processing of textiles, leather and similar products is greatly enhanced.

In the practice of our process we may follow any one of the following four procedures: (1st) Condensing the mixture under pressure in an autoclave; (2nd) Condensing the mixture in an autoclave under pressure in the presence of a catalyst; (3rd) Condensing the mixture under atmospheric pressure, by means of stirring and refluxing, over a period of time, raising the initial temperature gradually until a mean temperature of from 180° C. to 200° C. is attained; (4th) Heating the mixture under atmospheric pressure and in the presence of a catalyst, with stirring and refluxing, over a period of time, until the mean temperature attains 180 to 200° C.

The following examples will illustrate these procedures, but it will be understood that our invention is not limited either to the ingredients mentioned in these examples or to the precise procedure set out therein.

*Example 1—(Procedure 1)*

In an autoclave is placed a mixture composed of 60 parts of urea and 184 parts of cocoanut aldehyde and the mixture heated to 140° C. to 150° C. There is then introduced into the autoclave 220 parts of ethylene oxide over a period of from six to eight hours. The temperature is raised gradually to 180° to 200° C. until the pressure drops substantially to zero, with the product still at an elevated temperature. The product is a light colored wax-like product which is soluble to a very great extent in water and foams profusely. It is a suitable textile and leather assistant.

Example 2—(Procedure 2)

In an autoclave place a mixture composed of 76 parts of thio-urea, 272 parts lauryl alcohol (derived from cocoanut oils and containing at least 50% of the $C_{12}$ derivative, and 44 parts acetaldehyde. The mixture is heated to 120° to 130° C., and 580 parts of propylene oxide introduced over a period of from eight to ten hours, while the temperature is being raised slowly to 180° to 200° C., the pressure dropping substantially to zero while the product remains at an elevated temperature. The resulting product is a cream colored, thick, viscous, butter-like material and is a suitable textile and leather assistant. The reaction is carried out in the presence of a catalyst, as for example alkali hydroxide, alkali acetate, metallic halide, or mineral acid.

Example 3—(Procedure 3)

In a suitable apparatus provided with stirring and refluxing means is placed a mixture comprising: 150 parts of gelatin, 242 parts of cetyl alcohol, 72 parts of butyric aldehyde and 440 parts ethylene oxide. The mixture is allowed to stand at room temperature for 4 hours, after making the solution. The product is then gradually heated, the refluxing beginning at 48° to 51° C., and the temperature is gradually increased, (the water passing through the condenser being maintained at about +5° to 6° C.), until a mean temperature of 200° C. is attained, which requires from 40–60 hours. The product is thick, almost colorless, of a butter like to waxy consistency, and is a suitable textile and leather treatment and processing assistant.

Example 4—(Procedure 4)

In a suitable apparatus (as in Example 3) place a mixture composed of: 190 parts of 1,4=diamino, 2,6=dihydroxy naphthalene, 540 parts of oleyl alcohol, 580 parts of propylene oxide, and a suitable catalyst (such as sodium, potassium or other hydroxide, sodium or similar acetate, calcium, ferric, zinc, titanium, nickel, aluminum, or chromium chloride, sulfuric, hydrochloric or phosphoric acid), and with cooling maintained within the condenser of from +4° to +6° C., gradually heat the mixture until a mean temperature of 200° C. is attained, which requires from 16 to 20 hours. The product of the reaction is a light colored wax like material that is a suitable treatment material and processing assistant for textiles and leathers.

The following additional examples will serve to further illustrate our invention:

Example 5

In a suitable apparatus is placed a mixture comprising 100 parts of animal or fish glue, 240 parts of palmitic aldehyde and 720 parts of butylene oxide, and the reaction carried out as given in the preceding examples. The resulting product is a thick, viscous, butter-like product, almost colorless, and is a suitable textile and leather assistant.

Example 6

In a suitable apparatus is placed a mixture comprising: 100 parts of any desired polypeptin (although urea, alkyl urea, thio-urea or arylurea may be used instead), 298 parts of ricinoleic acid and 1100 parts of ethylene oxide. The reaction is carried out as in any one of the foregoing examples. The resulting products will vary according to the materials used, from a brittle wax-like product to a thick viscous oil, with varying degrees of water solubility. They may be lipophyllic or hydrophyllic at the same time and are suitable textile processing and treatment agents as well as suitable assistants for leather.

Example 7

In a suitable apparatus is placed a mixture comprising: 120 parts of urea, 303 parts stearyl chloride, 282 parts of oleic acid and 660 parts ethylene oxide. The reaction is catalyzed by the hydrogen chloride liberated, when carried out by Procedure 2 or 4, above. The resulting product is a light brown, butter-like material, suitable for the treatment and processing of textiles and leathers.

Example 8

In a suitable apparatus place a mixture of 60 parts of urea, 215 parts of p=toluidin—meta= amino phenol, 736 parts of lauryl alcohol, 580 parts propylene oxide, and a suitable catalyst, (such as nickel, chromium or silver oxide, etc.), and complete the product as in any of the preceding examples. The resulting product is a suitable textile and leather assistant.

Example 9

76 parts of thiourea, 400 parts cocoanut fatty acids, and 440 parts ethylene oxide with a suitable catalyst are placed in a suitable apparatus and condensed as described in Examples 2 or 4. The resulting product is a light, cream colored, wax-like product, suitable for textile and leather processing or treatment.

Example 10

76 parts thiourea, 100 parts gelatin, 810 parts of sebacic acid and 870 parts of propylene oxide, with a suitable catalyst are reacted as in Examples 2 or 4. The resulting product is a viscous gum-like, waxy product, light colored, and is suitable for sizing, treating and processing textiles.

Example 11

120 parts urea, 298 parts ricinoleic acid, 224 parts of sorbic acid, 880 parts ethylene oxide and a suitable catalyst are caused to react as described in Examples 2 or 4. The resulting product is nearly colorless, hard, brittle and wax-like, soluble in water to about 20% and is a suitable textile and leather, processing and treatment assistant.

Sulfuric acid treatment 100 parts of any of the products of examples 1 to 11 are placed in a suitable apparatus, with or without the use of a neutral solvent, and while stirring and cooling at −20° to +100° C. a suitable sulfonation agent (the amount varying from 25% to 200% of the material, depending upon the degree of sulfonation desired) such as sulfuric acid, concentrated sulfuric acid containing from 5 to 65% sulfuric anhydride, chlorosulfonic acid, aminosulfonic acid, etc., is added slowly. The stirring is then continued until the reaction is completed, and the resultant sulfonic acid or sulfate acid ester is isolated as such or it may be converted into its alkali salts and then isolated by known means. The resulting sulfonation product has great water solubility, and the hereinbefore mentioned properties, such as wetting, penetration, foaming, visibility, lime resisting, lime dispersion, softening, sizing, water-repelling, dye leveling, dye dispersion, foaming, detergency and emulsifying, are greatly enhanced.

What is claimed is:

1. The condensation product of a substance selected from the group consisting of urea, thiourea and gelatine, with an alkylene oxide, and an aldehyde containing from 8 to 20 carbon atoms.

2. The sulfuric acid derivative of a product obtained by condensing a substance selected from the group consisting of urea, thiourea and gelatine, with an alkylene oxide, and an aldehyde containing from 8 to 20 carbon atoms.

3. The product obtained by condensing a substance selected from the group consisting of urea, thiourea and gelatine, with an alkylene oxide and an aldehyde containing from 8 to 20 carbon atoms, in the presence of an alkaline catalyst selected from the group consisting of alkali metal hydroxides and alkali metal acetates.

4. The product obtained by condensing a substance selected from the group consisting of urea, thiourea and gelatine, with an alkylene oxide, and an aldehyde containing from 8 to 20 carbon atoms, in the presence of an alkaline catalyst selected from the group consisting of alkali metal hydroxides and alkali metal acetates, and subsequently sulfonating such condensate.

5. The process comprising condensing a substance selected from the group consisting of urea, thiourea and gelatine with an alkylene oxide, and an aldehyde containing from 8 to 20 carbon atoms.

6. The process comprising condensing a substance selected from the group consisting of urea, thiourea and gelatine with an alkylene oxide and an aldehyde containing from 8 to 20 carbon atoms, under increased pressure.

7. The process comprising condensing a substance selected from the group consisting of urea, thiourea and gelatine with an alkylene oxide, and an aldehyde containing from 8 to 20 carbon atoms by heating a mixture of the materials under atmospheric pressure to a temperature of about 180 to 200° C.

8. The process comprising condensing a substance selected from the group consisting of urea, thiourea and gelatine with an alkylene oxide and an aldehyde containing from 8 to 20 carbon atoms, by heating a mixture of the materials under atmospheric pressure to a temperature of about 180 to 200° C., in the presence of an alkaline catalyst selected from the group consisting of alkali metal hydroxides and alkali metal acetates.

9. In a process for producing leather and textile processing assistants, the step of converting condensates of compounds selected from the group consisting of urea, thiourea and gelatine with an alkylene oxide and an aldehyde containing from 8 to 20 carbon atoms, into a derivative selected from the group consisting of sulfates, sulfonates, and alkali metal salts thereof.

10. The process comprising condensing urea with an aldehyde derived from a fatty acid of cocoanut oil and ethylene oxide at a temperature of about 180 to 200° C.

11. The process comprising condensing urea with an aldehyde derived from a fatty acid of cocoanut oil and ethylene oxide at a temperature of about 180 to 200° C., in the presence of an alkaline catalyst selected from the group consisting of alkali metal hydroxides and alkali metal acetates.

12. The process comprising condensing urea with an aldehyde derived from a fatty acid of cocoanut oil and ethylene oxide at a temperature of about 180 to 200° C., and converting the condensate to a derivative selected from the group consisting of sulfates, sulfonates, and alkali metal salts thereof.

13. The product obtained by condensing urea with an aldehyde derived from a fatty acid of cocoanut oil and ethylene oxide at a temperature of about 180 to 200° C.

14. The product obtained by condensing urea with an aldehyde derived from a fatty acid of cocoanut oil and ethylene oxide at a temperature of about 180 to 200° C., and converting the condensate to a derivative selected from the group consisting of sulfates, sulfonates, and alkali metal salts thereof.

ALBERT FRANK BOWLES.
SAUL KAPLAN.